(12) United States Patent
Trépanier et al.

(10) Patent No.: US 11,349,271 B2
(45) Date of Patent: May 31, 2022

(54) FIXED BULK COMPRESSOR FOR USE IN A CHIRPED PULSE AMPLIFICATION SYSTEM

(71) Applicant: TERAXION INC., Québec (CA)

(72) Inventors: François Trépanier, Québec (CA); Pascal Deladurantaye, Québec (CA); Axel Saumier-Verret, Québec (CA); Sylvain Boudreau, Québec (CA); René Dionne, Québec (CA); Mathieu Demers, Québec (CA); Jean-Thomas Landry, Québec (CA)

(73) Assignee: TERAXION INC., Québec (CA)

( * ) Notice: Subject to any disclaimer, the term of this patent is extended or adjusted under 35 U.S.C. 154(b) by 689 days.

(21) Appl. No.: 16/209,399

(22) Filed: Dec. 4, 2018

(65) Prior Publication Data
US 2019/0173254 A1    Jun. 6, 2019

Related U.S. Application Data

(60) Provisional application No. 62/594,614, filed on Dec. 5, 2017.

(51) Int. Cl.
*H01S 3/00* (2006.01)
*H01S 3/04* (2006.01)
(Continued)

(52) U.S. Cl.
CPC .............. *H01S 3/0057* (2013.01); *H01S 3/02* (2013.01); *H01S 3/0405* (2013.01);
(Continued)

(58) Field of Classification Search
None
See application file for complete search history.

(56) References Cited

U.S. PATENT DOCUMENTS

| 5,847,863 A | 12/1998 | Galvanauskas et al. |
| 6,278,534 B1 | 8/2001 | Arns |
| (Continued) | | |

FOREIGN PATENT DOCUMENTS

| CA | 2371106 A1 | 8/2003 | |
| CA | 2383807 A1 | 10/2003 | |
| WO | WO9857400 A1 * | 12/1998 | ............... H01S 3/02 |

OTHER PUBLICATIONS

"POLARIS-19S50/M Support Documentation, Polaris® Fixed Mirror Mount for Ø19 mm Optics, 50 mm Beam Height", Thorlabs, 2014, whole document downloaded from the website: https://www.thorlabs.com/newgrouppage9.cfm?objectgroup_id=8067, on Feb. 22, 2019.

*Primary Examiner* — Mark Hellner
(74) *Attorney, Agent, or Firm* — Bookoff McAndrews, PLLC

(57) ABSTRACT

A bulk compressor for use in a chirped pulse amplification system (CPA) comprising a tunable pulse stretcher and an amplifier is provided. The bulk compressor includes a mounting block formed as a monolithic structure and made of solid material. The mounting block may define a plurality of mounting surfaces each forming a collar surrounding a light passage. Optical components are mounted on the mounting block in a fixed mutual spatial relationship, each optical component having a front face having a peripheral portion mounted in direct contact with the collar formed by a respective one of the mounting surfaces. The bulk compressor may be provided as a stand-alone component, a part of a stretcher-compressor pair or a full CPA system, and may be used in a method for amplifying input optical pulses.

33 Claims, 12 Drawing Sheets

(51) Int. Cl.
    *H01S 3/067*     (2006.01)
    *H01S 3/02*     (2006.01)

(52) U.S. Cl.
    CPC ........ *H01S 3/0675* (2013.01); *H01S 3/06725* (2013.01); *H01S 3/0071* (2013.01); *H01S 3/06754* (2013.01)

(56) References Cited

U.S. PATENT DOCUMENTS

| | | |
|---|---|---|
| 6,453,095 B2 | 9/2002 | Feng et al. |
| 6,501,883 B1 | 12/2002 | Painchaud et al. |
| 7,142,292 B2 | 11/2006 | Painchaud |
| 7,518,788 B2 | 4/2009 | Fermann et al. |
| 7,711,224 B1 | 5/2010 | Pelletier et al. |
| 7,822,347 B1 * | 10/2010 | Brennan, III .... H04B 10/25137 398/193 |
| 7,991,022 B1 * | 8/2011 | Soh .................. H01S 3/302 372/3 |
| 8,189,971 B1 | 5/2012 | Vaissie et al. |
| 8,300,669 B2 | 10/2012 | Dantus et al. |
| 8,498,538 B2 | 7/2013 | Greenberg et al. |
| 9,385,502 B1 | 7/2016 | Plewicki et al. |
| 2003/0189959 A1 | 10/2003 | Erbert et al. |
| 2003/0198434 A1 | 10/2003 | Lachance et al. |
| 2003/0218795 A1 | 11/2003 | Barty |
| 2004/0263950 A1 | 12/2004 | Fermann et al. |
| 2009/0128892 A1 | 5/2009 | Wise et al. |
| 2018/0287327 A1 * | 10/2018 | Yang .................. G02B 27/0944 |

\* cited by examiner

FIXED BULK COMPRESSOR FOR USE IN A CHIRPED PULSE AMPLIFICATION SYSTEM

CROSS-REFERENCE TO RELATED APPLICATIONS

This application claims benefit of priority under 35 U.S.C. § 119 to U.S. Provisional Application No. 62/594,614, filed on Dec. 5, 2017, which is incorporated by reference herein in its entirety.

TECHNICAL FIELD

The technical field generally relates to a chirped pulse amplification system and more particularly concerns the use of a fixed bulk compressor in such a system.

BACKGROUND

Chirped pulse amplification (CPA) is a widely used technique to amplify light pulses to high energies, while mitigating the deleterious effects of nonlinearities. This is achieved by temporally spreading the pulse before amplification to reduce peak power, followed by post-amplification compression, resulting in a short, high energy pulse train.

A CPA system is thus composed of three main parts: a stretcher, an amplifying stage, and a compressor. When using a fiber-based amplifier, it is advantageous to use a stretcher which is also fiber-based, as it is simple to use and does not need to be aligned, aside from fiber splices.

However, at the output of the amplifier, a bulk compressor, often in the form of a Treacy grating pair, is necessary. This is because the light in such a compressor travels through little to no bulk material, with a relatively high beam diameter, reducing peak irradiance. This is significant, since peak power is maximized at the output of the compressor, and this is where light is most susceptible to nonlinear effects.

In a CPA system, the bulk compressor is often composed of disjoint optical elements that need to be individually aligned. Furthermore, the distance and/or angle between gratings need to be tunable, as minute adjustments are required to match the dispersive characteristics of the stretcher and other system components to optimize pulse duration. All those factors lead to a compressor that can be bulky and cumbersome to align.

In view of the above, there remains a need for compressor designs that eliminate at least some of the aforementioned drawbacks.

SUMMARY

In accordance with one aspect, there is provided a chirped pulse amplification system for amplifying optical pulses.

The chirped pulse amplification system includes a pulse stretcher comprising an optical fiber provided with a Fiber Bragg grating (FBG) having a dispersion profile designed to stretch each of the optical pulses into stretched optical pulses. The pulse stretcher further comprises a tuning mechanism coupled to the FBG for tuning the dispersion profile.

The chirped pulse amplification system further includes an amplifier receiving and amplifying the stretched optical pulses into amplified stretched optical pulses.

The chirped pulse amplification system also includes a bulk compressor provided downstream the amplifier for compressing the amplified stretched optical pulses into amplified compressed optical pulses. The bulk compressor comprises a mounting block made of solid material and defining a plurality of mounting surfaces. The bulk compressor further comprises a plurality of optical components performing the compressing and mounted on the mounting block in a fixed mutual spatial relationship. Each of the optical components is rigidly affixed to a respective one of the mounting surfaces.

In some implementations, the pulse stretcher comprises a circulator successively connecting an input port for receiving the input optical pulses, an FBG port connected to the optical fiber to direct the input optical pulses towards the FBG and receiving the stretched optical pulses, and an output port for directing the stretched optical pulses towards the amplifier. The FBG may have a chirped grating period.

In some implementations, the pulse stretcher comprises a tuning mechanism coupled to the FBG for tuning the dispersion profile of the FBG. The tuning mechanism may be configured to apply a temperature variation to the optical fiber which is non-uniform along the FBG, or a strain on the optical fiber which is non-uniform along the FBG.

In some implementations, the chirped pulse amplification system may further include a feedback loop controlling the tuning mechanism based on the amplified compressed optical pulses. The feedback loop may comprise a pulse measurement device disposed downstream the bulk compressor and configured to measure and analyse the amplified compressed optical pulses. The pulse measurement device may send a feedback signal to the tuning mechanism. The feedback loop may be configured to adjust the dispersion profile of the FBG of the pulse stretcher to compensate for at least one of misalignments or manufacturing errors of said system or nonlinear effects induced in the amplified stretched optical pulses by the amplifier.

In some implementations, the amplifier is a fiber amplifier.

In some implementations, the mounting block of the bulk compressor is a monolithic structure and may be made of a machinable and thermally stable material.

Each optical component of the bulk compressor may be one of a grating, a lens, or a mirror.

In some implementations, the optical components of the bulk compressor are mounted into a Treacy configuration. The bulk compressor may comprise an input receiving the amplified stretched optical pulses as an input beam, and the optical components of the bulk compressor may include a first grating angularly dispersing the input beam, a second grating spatially dispersing the input beam, and a pair of plane mirrors shifting and retro-reflecting the input beam for retro-propagation through the second grating and first grating. In some implementations, the pair of plan mirrors may be disposed in a rooftop configuration.

In some implementations, at least one of the mounting surfaces of the bulk compressor forms a collar surrounding a light passage, and the optical component affixed to this at least one of the mounting surfaces has a front face comprising a peripheral portion mounted in direct contact with said collar. The optical components may be glued to the mounting block from the side.

In some implementations, each of the mounting surfaces of the bulk compressor forms a collar surrounding a light passage, and each of the optical components of the bulk compressor is disposed for use in reflection and has a front face comprising a peripheral portion mounted in direct contact with the collar formed by the respective one of the mounting surfaces. The optical components may be glued to the mounting block from the side.

In accordance with another aspect, there is provided a stretcher-compressor pair for use with an amplifier in a chirped pulse amplification system. The stretcher-compressor pair comprises:
- a pulse stretcher having an input port configured to receive input optical pulses and an output port configured to output stretched optical pulses, the pulse stretcher comprising an optical fiber provided with a fiber Bragg grating (FBG) having a dispersion profile designed to stretch the input optical pulses, said pulse stretcher further comprising and a tuning mechanism coupled to the FBG for tuning said dispersion profile; and
- a bulk compressor having an input configured to receive amplified stretched optical pulses and an output configured to output amplified compressed optical pulses, the bulk compressor comprising a mounting block made of solid material and defining a plurality of mounting surfaces, the bulk compressor further comprising a plurality of optical components mounted on the mounting block in a fixed mutual spatial relationship, each of the optical components being rigidly affixed to a respective one of the mounting surfaces.

In some implementations, the pulse stretcher comprises a circulator successively connecting said input port, an FBG port connected to said optical fiber to direct the input optical pulses towards the FBG and receiving the stretched optical pulses and said output port.

In some implementations, the FBG has a grating period with a pre-existing chirp and the tuning mechanism is configured to modify said chirp. In other variants, the FBG has a uniform grating period and the tuning mechanism is configured to impose a chirp thereon.

In some implementations, the tuning mechanism is configured to apply a temperature variation to the optical fiber which is non-uniform along the FBG and may comprises an elongated heat conductive member in thermal contact with the optical fiber provided along said FBG, and a plurality of heat pumping elements in contact with the elongated heat conductive member and distributed along a length thereof.

In some implementations, the tuning mechanism is configured to apply a strain on the optical fiber which is non-uniform along the FBG.

In some implementations, the mounting block of the bulk compressor is a monolithic structure and may be made of a machinable and thermally stable material.

In some implementations, each optical component of the bulk compressor is one of a grating, a lens, or a mirror.

In some implementations, the optical components of the bulk compressor are mounted into a Treacy configuration.

In some implementations, the bulk compressor comprises an input receiving the amplified stretched optical pulses as an input beam, and the optical components of the bulk compressor comprise a first grating angularly dispersing the input beam, a second grating spatially dispersing the input beam and a pair of plane mirrors shifting and retro-reflecting the input beam for retro-propagation through the second grating and first grating. The pair of plan mirrors may be disposed in a rooftop configuration.

In some implementations, at least one or each of the mounting surfaces of the bulk compressor forms a collar surrounding a light passage, and the optical component affixed to said mounting surfaces has a front face comprising a peripheral portion mounted in direct contact with said collar. The optical components may be glued to the mounting block from the side.

In accordance with another aspect, there is provided a bulk compressor for use with an amplifier in a chirped pulse amplification system comprising a tunable pulse stretcher. The bulk compressor comprises a mounting block formed as a monolithic structure and having an input configured to receive stretched optical pulses and an output configured to output compressed optical pulses. The mounting block is made of solid material and defines a plurality of mounting surfaces each forming a collar surrounding a light passage. The bulk compressor further includes a plurality of optical components mounted on the mounting block in a fixed mutual spatial relationship. Each of the optical components has a front face comprising a peripheral portion mounted in direct contact with the collar formed by a respective one of the mounting surfaces.

In some implementations, the mounting block is made of a machinable and thermally stable material.

In some implementations, each optical component is one of a grating, a lens, or a mirror.

In some implementations, the optical components are mounted into a Treacy configuration.

In some implementations, the optical components comprise a first grating angularly dispersing the stretched optical pulses, a second grating spatially dispersing the stretched optical pulses, and a pair of plane mirrors shifting and retro-reflecting the stretched optical pulses for retro-propagation through the second grating and first grating. The pair of plan mirrors may be disposed in a rooftop configuration.

In some implementations, the optical components are glued to the mounting block from the side. The mounting block comprises side walls surrounding each of said collars, and further comprise a plurality of side holes extending through said sides walls for receiving an adhesive therethrough.

In accordance with another aspect, there is provided a method of manufacturing a bulk compressor, comprising:
a) machining a monolithic mounting block in a solid and thermally stable material, said mounting block defining a plurality of mounting surfaces each forming a collar surrounding a light passage; and
b) mounting a plurality of optical components on the mounting block in a fixed mutual spatial relationship, said mounting comprising, for each optical component:
  i. positioning a front face of the optical component in direct contact with the collar formed by a respective one of the mounting surfaces of the mounting block;
  ii. providing a temporary fixture to hold said optical component in place;
  iii. gluing the optical component to the mounting block from the side using an adhesive;
  iv. once said adhesive has cured, removing the temporary fixture.

In some implementations, each optical component is one of a grating, a lens, or a mirror.

In some implementations, the optical components are mounted into a Treacy configuration.

In some implementations, the bulk compressor comprises an input receiving amplified stretched optical pulses as an input beam, and the optical components of the bulk compressor comprise a first grating angularly dispersing the input beam, a second grating spatially dispersing the input beam, and a pair of plane mirrors shifting and retro-reflecting the input beam for retro-propagation through the second grating and first grating. The pair of plan mirrors may be disposed in a rooftop configuration.

In some implementations, the gluing the optical component to the mounting block from the side comprises inserting said adhesive through side holes provided through side walls surrounding each of said collars.

In some implementations, the temporary fixture comprises a clamp.

In some implementations, the method further comprises a step adjusting a clocking angle of at least one of said optical components.

In accordance with yet another aspect, there is provided a method for amplifying input optical pulses, comprising, successively:
a) stretching the input optical pulses into stretched optical pulses using a Fiber Bragg grating (FBG) having a tunable dispersion profile;
b) amplifying the stretched optical pulses into amplified stretched optical pulses; and
c) compressing the amplified stretched optical pulses into amplified compressed optical pulses using a bulk compressor comprising a mounting block made of solid material and defining a plurality of mounting surfaces, the bulk compressor further comprising a plurality of optical components performing said compressing and mounted on the mounting block in a fixed mutual spatial relationship, each of the optical components being rigidly affixed to a respective one of the mounting surfaces; and
d) providing a feedback loop measuring and analysing the amplified compressed optical pulses and tuning the dispersion profile of the FBG in view of said analysing.

In some implementations, the stretching of the optical pulses comprises providing a circulator successively connecting an input port for receiving the input optical pulses, an FBG port connected to an optical fiber hosting said FBG to direct the input optical pulses towards the FBG and receiving the stretched optical pulses, and an output port for directing the stretched optical pulses towards the amplifier.

In some implementations, the FBG has a chirped grating period.

In some implementations, the tuning of the dispersion profile of the FBG comprises applying a temperature variation which is non-uniform along the FBG.

In some implementations, the tuning of the dispersion profile of the FBG comprises applying a strain to an optical fiber hosting the FBG which is non-uniform along the FBG.

In some implementations, the feedback loop comprises adjusting the dispersion profile of the FBG of the pulse stretcher to compensate for misalignments of the bulk compressor.

In some implementations, the feedback loop comprises adjusting the dispersion profile of the FBG of the pulse stretcher to compensate for manufacturing errors of said bulk compressor.

In some implementations, the feedback loop comprises adjusting the dispersion profile of the FBG of the pulse stretcher to compensate for nonlinear effects induced in the amplified stretched optical pulses.

In some implementations, the amplifying of the stretched optical pulses comprises using a fiber amplifier.

Advantageously, the bulk compressor described herein defines a fixed and sturdy structure, which simplifies its use compared to traditional devices. In a typical tunable bulk grating-based pulse compressor, each optical component is physically disjoint from the other components. This makes the correct placement and alignment of the components a cumbersome and tedious process. By contrast, the CPA system described herein relies on the tunability of the pulse stretcher for adjustments, combined with a compressor having fixed grating parameters and free of moving parts. This simplifies the usual grating pair alignment process greatly, since this alignment is essentially dictated by the mounting block. The alignment complexity issues are therefore transferred to machining tolerance issues, which are much easier to manage.

In accordance with another aspect, there is provided a stretcher-compressor pair for use with an amplifier in a chirped pulse amplification system. The stretcher-compressor pair includes a pulse stretcher having an input configured to receive input optical pulses and an output configured to output stretched optical pulses. The pulse stretcher includes a fiber Bragg grating (FBG) having a dispersion profile designed to stretch optical pulses, and a tuning mechanism coupled to the FBG for tuning said dispersion profile.

The stretcher-compressor pair further includes a bulk compressor having an input configured to receive amplified stretched optical pulses and an output configured to output amplified compressed optical pulses. The bulk compressor includes a mounting block made of solid material and defining a plurality of mounting surfaces, the bulk compressor further comprising a plurality of optical components mounted on the mounting block in a fixed mutual spatial relationship, each of the optical components being rigidly affixed to a respective one of the mounting surfaces.

In other implementations, there may also be provided a bulk compressor as described above provided for use in a CPA system in conjunction with an amplifier and a pulse stretcher having an FBG and a tuning mechanism coupled to said FBG.

Other features and advantages will be better understood upon reading of embodiments thereof with reference to the appended drawings.

DETAILED DESCRIPTION

In accordance with one aspect, there is provided a chirped pulse amplification system for amplifying optical pulses. There is also provided a stretcher-compressor pair, or a bulk compressor for use in such a CPA system. A method of manufacturing a bulk compressor and a method for amplifying input optical pulses are also provided.

CPA systems such as described herein may be useful in a variety of applications. Examples of applications of CPA systems include micromachining (e.g. fuel injectors, battery electrodes cutting), ophthalmology, lab-on-a-chip, semiconductor dicing, stents manufacturing, internal engraving of transparent material, etc.

Figure 1:
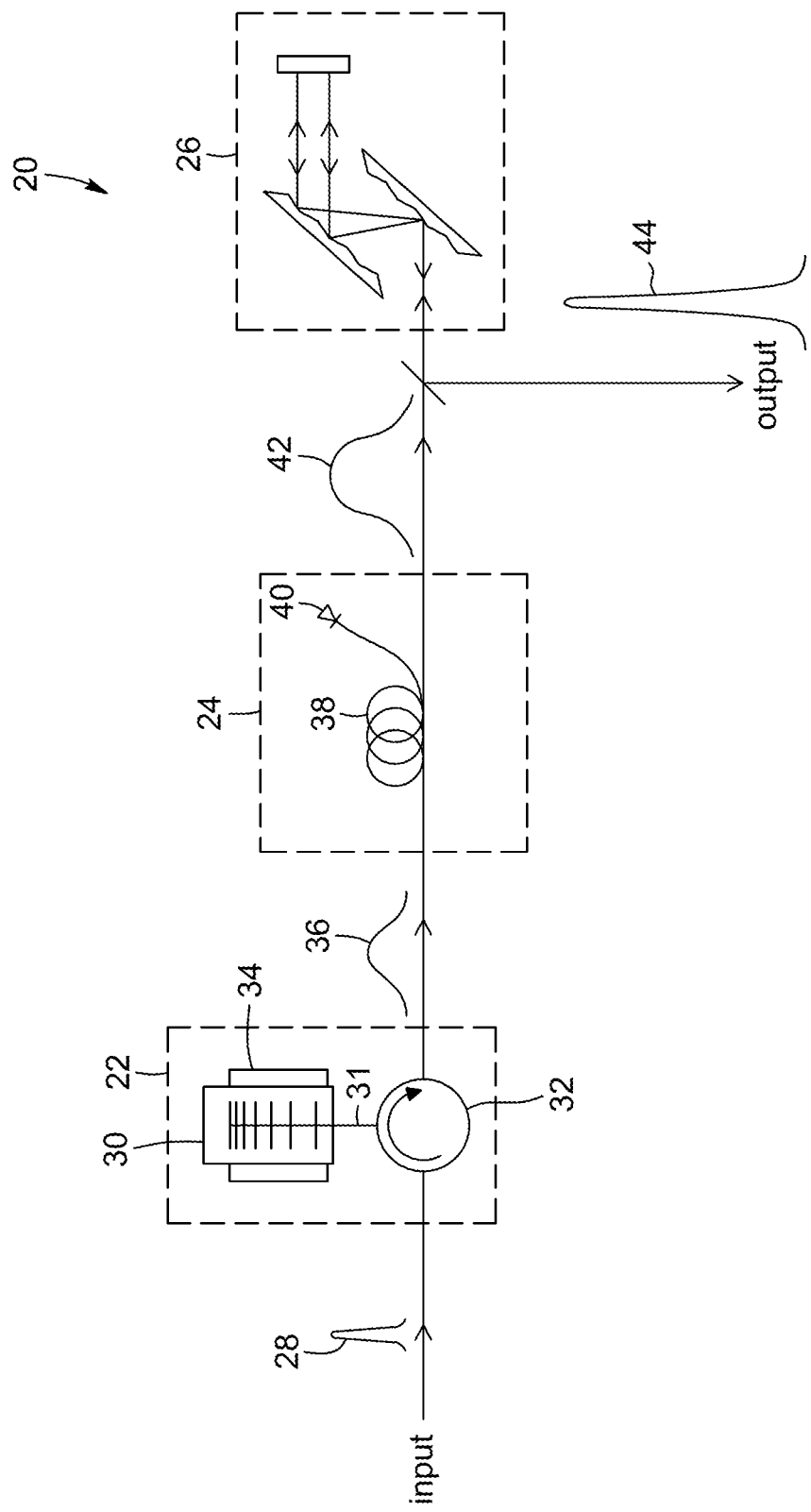
FIG. 1 is a schematized representation of a CPA system according to one embodiment.

Referring to FIG. 1, a CPA system 20 according to one implementation is schematically illustrated. The illustrated CPA system 20 includes three major modules or components: a fiber pulse stretcher 22, an amplifier 24 and a bulk compressor 26.

The CPA system 20 is configured to receive as input a light beam including one or more laser pulses, referred to herein as the input optical pulses 28. A single pulse 28 is illustrated on FIG. 1 by way of example only. It will be readily understood that the input light beam may include a single pulse or a plurality of pulses, and that the use of the singular or plural in the present description is not meant as a limitation to the scope of application. The input optical pulses 28 may be generated from any one of a variety of oscillators or laser devices such as bulk, fiber-based or semiconductor-based mode-locked lasers, as well known in the art. The input optical pulses 28 are coupled to the CPA system 20 through any suitable direct or indirect coupling scheme, such as for example a fiber splice between respective optical fibers on both sides.

The pulse stretcher 22 includes a fiber Bragg grating (FBG) 30. The FBG 30 has a dispersion profile designed to stretch each of the optical pulses 28 into time-spread spectral components, such that each input optical pulse 28 is spread into a longer pulse of similar energy, defining a stretched optical pulse 36.

Throughout the present description, the expressions "refraction index grating" or "Bragg grating" are used interchangeably to refer to a periodic or aperiodic refractive index pattern induced in a waveguide, the expression "fiber Bragg grating" or "FBG" being used in the art when the waveguide is an optical fiber 31. A fiber Bragg grating allows light propagating into the host optical fiber 31 to be reflected in a counterpropagating direction when its wavelength corresponds to the Bragg wavelength of the refractive index pattern, which is related to its period. A chirped fiber Bragg grating has a period, and therefore a Bragg wavelength which varies as a function of the position along the fiber. The reflectivity profile of a chirped Bragg grating is also designated as its dispersion profile, as different wavelengths are reflected at distinct positions along the grating, subjecting them to different delays, therefore creating a chromatic dispersion of the pulse. The refractive index pattern can be designed to provide a dispersion profile tailored to the desired impact on the characteristics of the reflected light.

It will be readily understood that the FBG 30 may designed to have a complex dispersion profile in view of the desired characteristics of the stretched optical pulses 36, as is well known in the art. For more information on FBG design and fabrication considerations, reference can for example be made to U.S. Pat. No. 7,142,292 (PAINCHAUD) and U.S. Pat. No. 6,501,883 (PAINCHAUD et al), the entire contents of which is incorporated herein by reference.

In some implementations, the FBG may be designed by referring to dispersive characteristics of other components of the CPA system (fibers, amplifier and compressor) to determine its dispersion profile, for example using transfer matrix methods to calculate the response of the Bragg grating. The FBG may then be written according to this design. In some implementations, the writing of the FBG involves the use of a phase mask as known in the art, optionally using the methods described in the above-mentioned U.S. Pat. No. 6,501,883. Residual dispersion profile errors may then be mitigated using a post correction method such as for example described in U.S. Pat. No. 7,142,292. Once the FBG is integrated to the CPA system, final adjustments can be made using the tuning mechanism described hereinafter.

In the illustrated configuration, the pulse stretcher 22 includes a circulator 32 directing the input optical pulses 28 towards the FBG 30, and then receiving and directing the reflected stretched optical pulses 36 from the FBG 30 towards the amplifier 24. It will be readily understood by one skilled in the art that other configurations may be envisioned. Preferably, the pulse stretcher 22 is entirely fiber-based.

The pulse stretcher 22 further includes a tuning mechanism 34 coupled to the FBG 30 for tuning its dispersion profile. As known in the art, the wavelength of peak reflection for a Bragg grating can be shifted by a change in either the strain or the temperature (or both) imposed on the grating. If the optical fiber 31 hosting the Bragg grating 30 is subject to a strain or temperature gradient, the modulation period of the index of refraction pattern and the mean index of refraction can be modified with the goal of fine-tuning the dispersion characteristic of the grating. The tuning mechanism 34 may therefore include an assembly changing the strain applied to the optical fiber 31 hosting the FBG, an assembly applying a temperature gradient to this optical fiber 31, or a combination of both.

In some implementations, the tuning mechanism 34 may be configured to apply a strain or temperature variation which is non-uniform along the grating, that is, locally changing the temperature or strain along different portions of the grating. As will be readily understood by one skilled in the art, a non-uniform heating or strain induces a chirp in the grating or modifies a pre-existing chirp. Controlling the magnitude of the thermal gradient or strain variation controls the magnitude of the resulting chirp, and thus there is provided a form of local adjustment of the spectral reflectivity of the grating.

Figure 2:
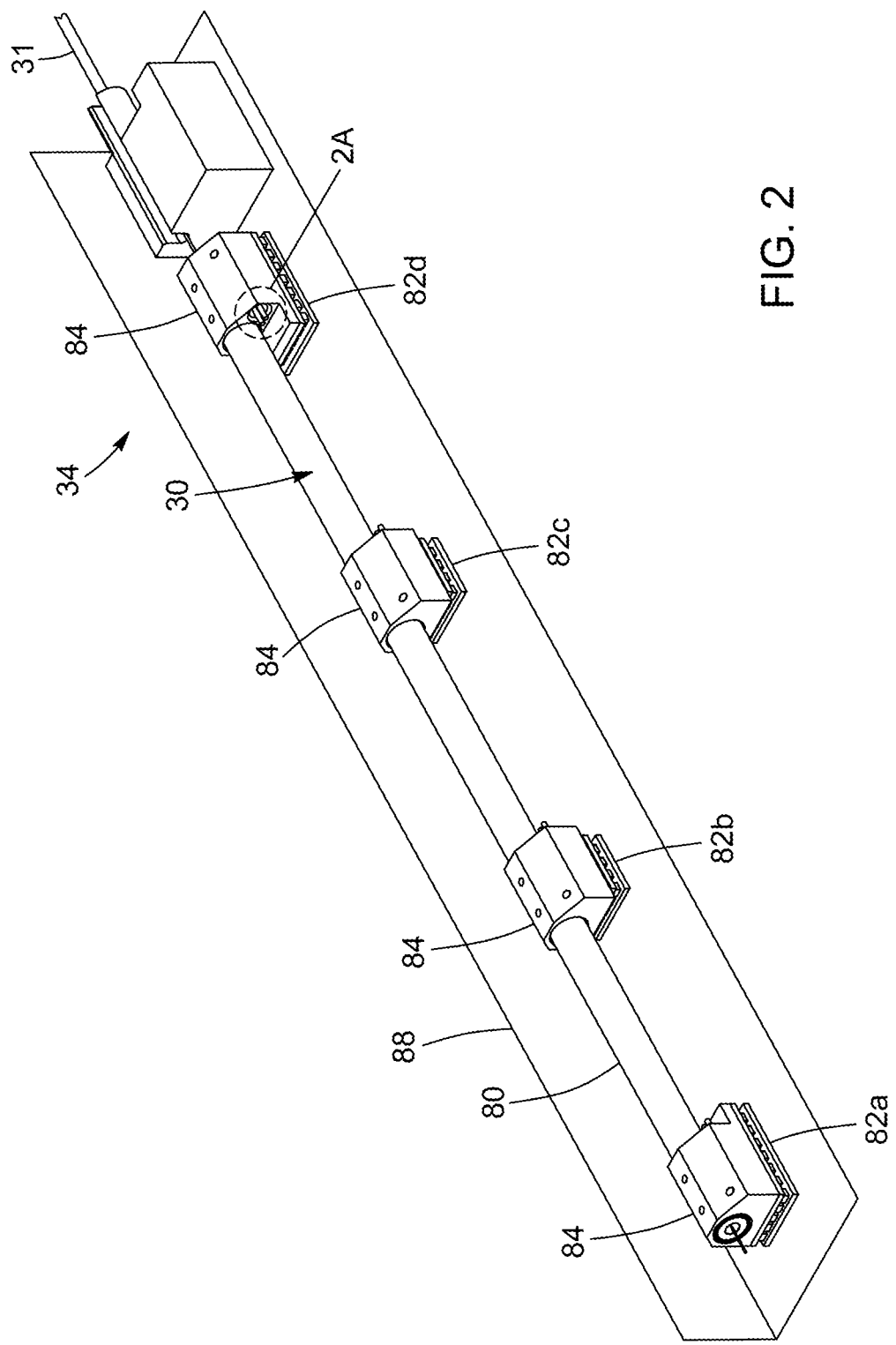
FIG. 2 is a partial cross-sectional side elevation view of a pulse stretcher including a tuning mechanism applying a temperature gradient on a FBG according to one implementation.

Referring to FIG. 2, there is shown an example of a tuning mechanism 34 imposing a thermal gradient on the FBG 30. In this variant, the optical fiber 31 hosting the FBG 30 is preferably in close contact or proximity with an elongated heat conductive member called herein the natural gradient tube 80, inside which the fiber 31 rests freely. The natural gradient tube 80 may have a cylindrical hollow shape and is preferably made of a good heat conductor, typically a metal. The natural gradient tube 80 allows a uniform heat transfer along its length and thus creates a smooth temperature profile along the fiber. Advantageously, the natural gradient tube 80 can isolate the fiber 31 from surrounding temperature perturbations.

In some variants, a thermal compound may be provided between the natural gradient tube 80 and the host optical fiber 31 to ensure a good replication of the temperature profile along the natural gradient tube in the fiber. In such an embodiment, the optical properties of the FBG 30 are advantageously unaffected by the contact between the optical fiber and the natural gradient tube, and long-term reliability is promoted as no mechanical stress is applied to the optical fiber at any point. Within this preferred embodiment, the fiber can remain unaffected by the thermal expansion (or contraction) of the metallic tube, since they are not mechanically coupled to one another.

The natural gradient tube 80 may further be thermally isolated from its surroundings to ensure the quality of the induced thermal profile. A Dewar type thermos system, with an inner shield to improve radiation isolation, can be used for this purpose. A low emissivity construction, using for example a rod with a mirror finish surface, may be used to further improve the performance of the device.

Referring still to FIG. 2, in the illustrated variant the tuning mechanism 34 includes four heat pumping elements 82a, 82b, 82c and 82d affixed in close physical contact to the natural gradient tube 80. As will be readily understood, a different number of heat pumping elements may be provided. The heat pumping elements 82 are distributed, evenly or unevenly, along the length of the natural gradient tube 80. The contact between the natural gradient tube 80 and each heat pumping element 82 may be ensured using an appropriate technique such as pressure mounting with a thermal compound, thermal gluing, soldering, or the like. In some variants, the contact between the natural gradient tube 80 and the heat pumping elements 82 may be indirect, using thermal bridging components 84. The heat pumping elements 82 may for example be embodied by Peltier effect Thermo Electric Coolers, referred hereafter as TECs. The TECs are configured to pump heat from one side of their body to the other, thereby controlling the temperature of the natural gradient tube at the point of contact therebetween. The thermal conductivity of the natural gradient tube 80 allows the heat distribution along the tube 80 to settle into a smooth temperature profile between the fixed temperature points provided by the heat pumping elements 82.

Figure 2A:
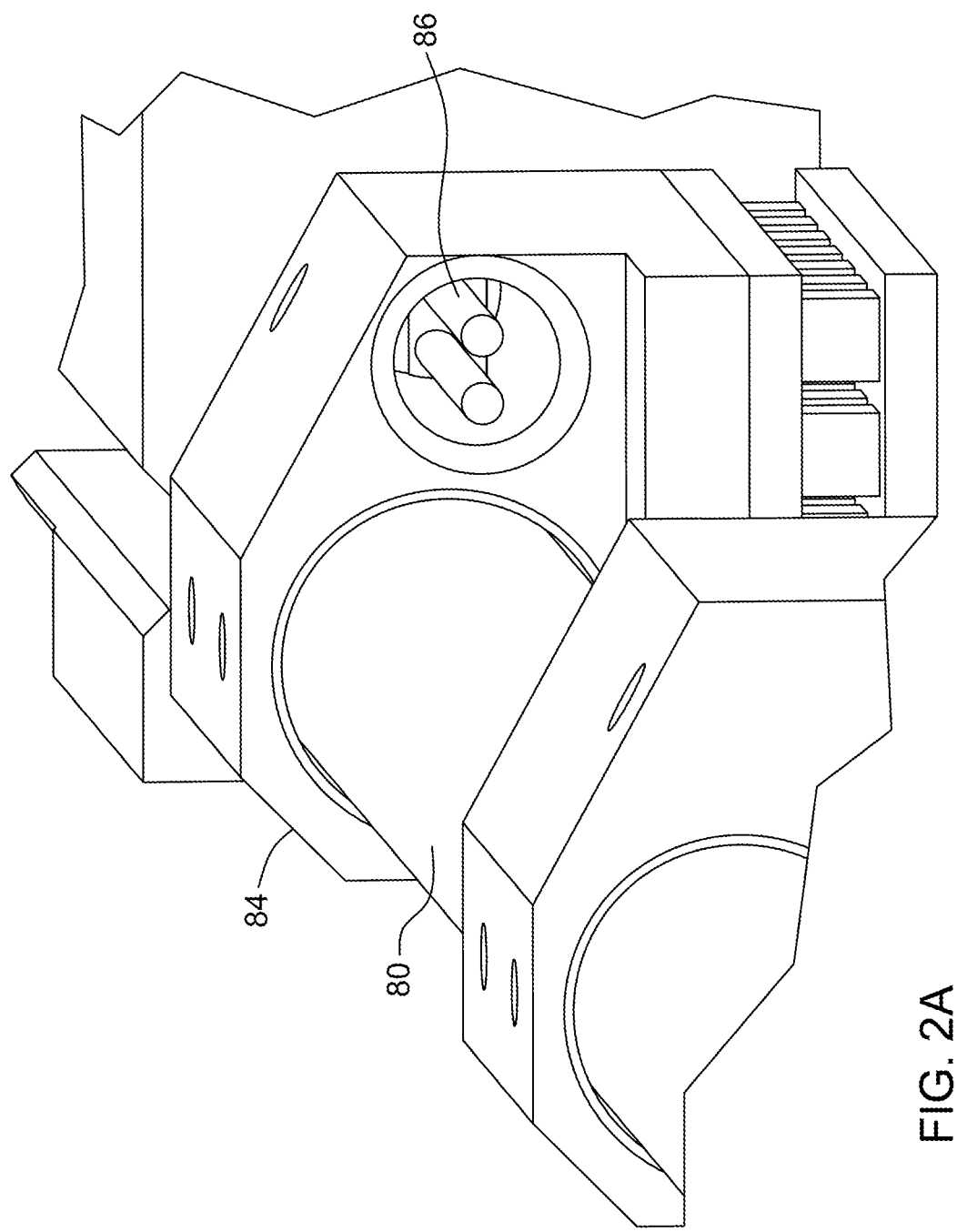
FIG. 2A is an enlarged view of a portion of FIG. 2.

The tuning mechanism 34 may further include one or more temperature sensors 86 placed in close proximity to the natural gradient tube 80. The temperature sensor may for example be embodied by a thermistor or a resistance temperature detector (RTD). As shown in FIG. 2A, by way of example, a RTD 86 may be provided in association with each heat pumping element 82a, 82b, 82c and 82d. Each temperature sensor 86 is affixed in close contact with the natural gradient tube 80 using an appropriate technique, for example using a thermally conductive epoxy. Signals from the temperature sensors 86 are used as input to a servo control system (not shown) to precisely control, that is, fix and maintain, the temperature profile along the grating. Such means for temperature control are well known in the art, and typically include appropriate control electronics and drivers such as TEC controllers with PID servo-control for optimum dynamic operation.

In some implementations, the TECs 82 are directly mounted on a heat sink 88. The heat sink 88 may for example be embodied by a standard dissipative heat sink provided with fins, or more simply by a large heat dissipation plate. In other variants, the heat sink 88 may be embodied by a metallic casing used for packaging the FBG, such as shown in the variant of FIG. 2. In further variants, the TECs 82 may be mounted on a thermally conductive metallic recirculation bar (not shown) to improve the energy efficiency of the whole device. Such an assembly is for example shown in Canadian patent applications no. 2,371,106 and 2,383,807 (LACHANCE et al).

Referring back to FIG. 1, and as mentioned above, the CPA system 20 next includes an amplifier 24. The amplifier 24 may be embodied by any light amplification device suitable to increase the intensity of the stretched optical pulses 36. In the illustrated embodiment, the amplifier 24 is a fiber amplifier. The expression "fiber amplifier" is understood to refer to any device wherein an optical fiber is used as a gain medium to amplify light. Typically, the fiber amplifier includes a length of doped optical fiber 38 provided with rare-earth dopants such as erbium, ytterbium or the like. The doped optical fiber 38 is pumped using a pump source 40. The pump light from the pump source 40 may be injected into the doped optical fiber 38 in a copropagating or counter propagating direction with respect to the propagation of the stretched optical pulses 36 being amplified. It will be readily understood that the fiber amplifier 24 may be configured in a variety of manners and may include specialty fibers or components, multiple amplification stages, etc. In other variants, the amplifier 24 may be a non-fiber device and may for example be implemented in various materials and geometries such as a rod, slab, disk, etc.

The fiber amplifier 24 receives and amplifies the stretched optical pulses 36 into amplified stretched optical pulses 42. As the energy of each input optical pulse 28 is spread over the longer stretched optical pulse 36, the instantaneous peak power along the pulse is reduced, allowing its amplification while avoiding or mitigating non-linear effects known to affect pulses having high peak power.

It will be readily understood that the pulse stretcher 22 and fiber amplifier 24 need not be immediately consecutive and that the CPA system 20 may include additional components or devices in-between such as couplers, pre-amplification stages, etc.

As also mentioned above, and still referring to FIG. 1, the CPA system next includes a bulk compressor 26. The bulk compressor 26 is provided downstream the fiber amplifier 24 and is for compressing the amplified stretched optical pulses 42 into amplified compressed optical pulses 44. As will be readily understood by one skilled in the art, the amplified stretched optical pulses 42 may be coupled out of the fiber path following the fiber amplifier 24 and into the free space propagation path of the bulk compressor through a suitable optical coupling assembly (not shown).

Figure 3A:
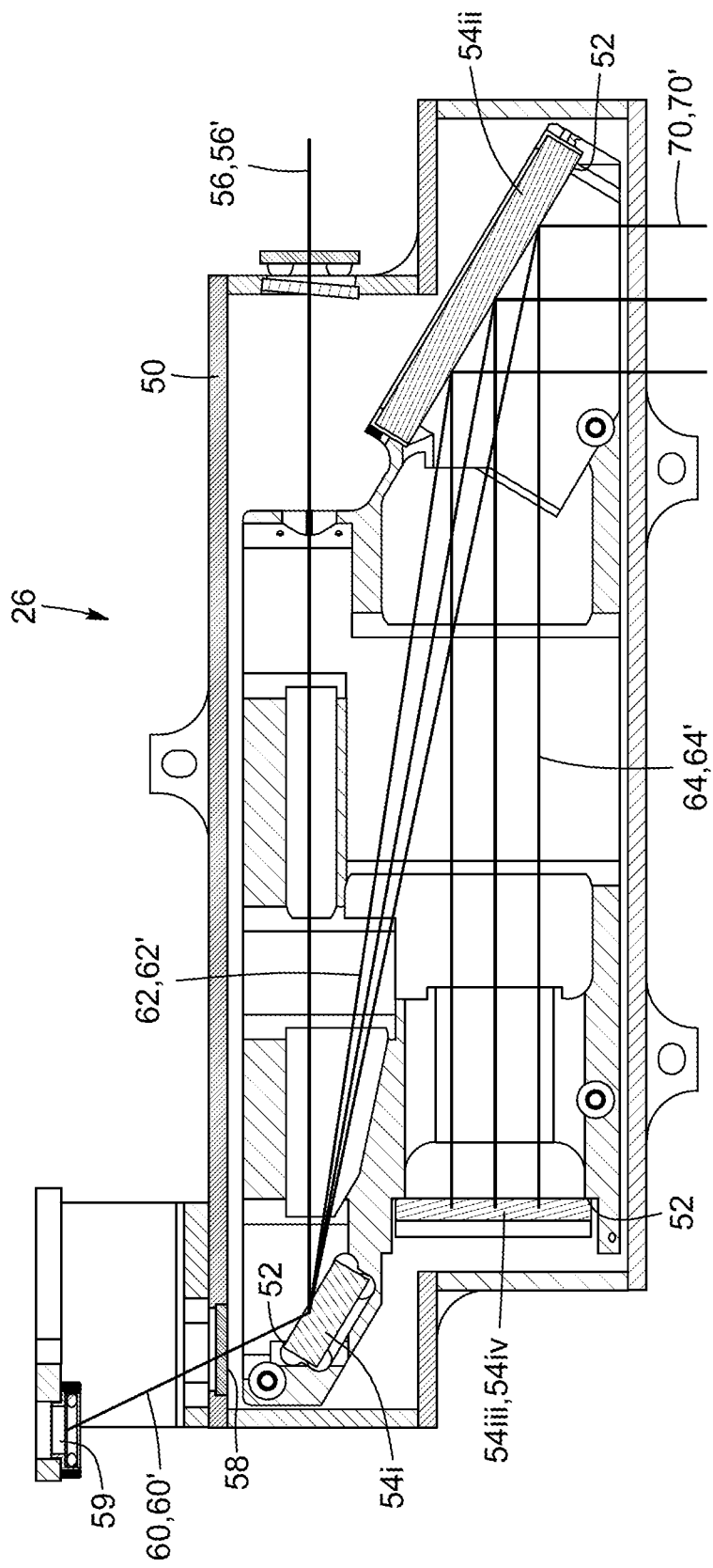
FIGS. 3A and 3B are schematized top view and side view respectively of a bulk compressor according to one embodiment.
Figure 3B:
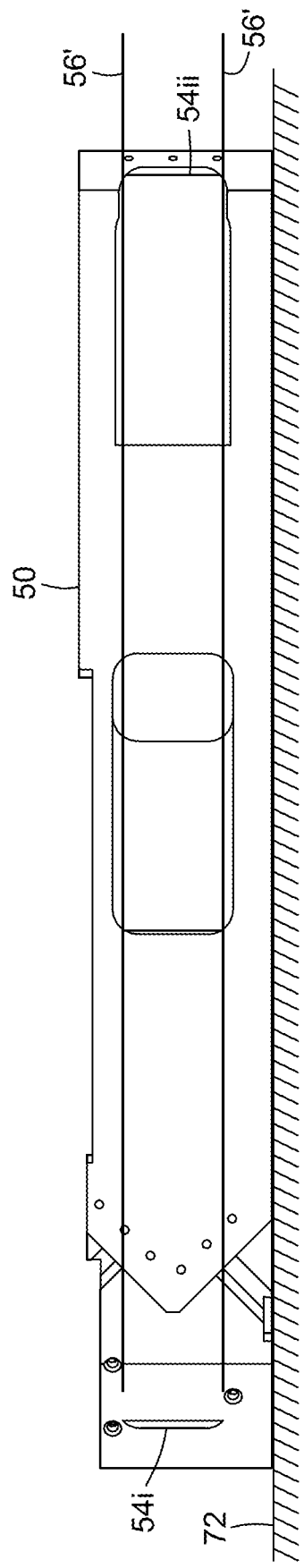

Referring to FIGS. 3A and 3B, there is illustrated an exemplary configuration for the bulk compressor 26 according to one embodiment. The bulk compressor 26 includes a mounting block 50. The mounting block 50 is made of solid material and is free of moving parts. Preferably the mounting block 50 is a monolithic structure, although in some variants it may be manufactured as separate pieces rigidly affixed together. The mounting block 50 is preferably a machined structure and may for example be made of a highly machinable aluminum alloy, although any machinable and sufficiently thermally stable material may be used. In one variant, the mounting block 50 may be machined using a CNC machine. In other variants, different high precision fabrication methods may be used, such as for example 3D printing or the like.

The mounting block 50 defines a plurality of mounting surfaces 52. The bulk compressor 26 further includes a plurality of optical components 54 mounted on the mounting block 50 in a fixed mutual spatial relationship, each of the optical components 54 being rigidly affixed to a respective one of the mounting surfaces 52. In other words, the mounting surfaces 52 precisely dictate the placement of the optical components 54 that provide the pulse compression capabilities.

Each optical component 54 may be embodied by a grating, mirror, lens, or other element providing an optical function such as redirecting, focussing, collimating, or otherwise affecting light. It will be readily understood that the optical components 54 are collectively selected and arranged such that the net result of the propagation of the amplified stretched optical pulses through the bulk compressor 26 is the compression of these pulses into the desired amplified compressed optical pulses. In the illustrated example, the optical components 54 are mounted into a Treacy configuration. In this implementation, the optical components include a first grating 54i, a second grating 54ii and a pair of plane mirrors 54iii and 54iv. Preferably, the first and the second gratings 54i and 54ii are embodied by surface-etched bulk gratings, which may operate in reflection or in transmission, depending on the configuration of the bulk compressor 26.

In operation of the illustrated variant, an input beam 56, embodied by the amplified stretched optical pulses, enters the bulk compressor 26 from the right in the views represented on FIGS. 3A and 3B. The input beam 56 reaches the first grating 54i. The mounting block 50 preferably has an opening 58 through which the zero-order reflection 60 from the first grating 54i may leave the compressor 26. An external alignment target 59 may be placed in the path of the extracted zero-order reflection 60. The negative first order reflection 62 is angularly dispersed until it reaches the second grating 54ii, where angular dispersion is converted to spatial dispersion. The resulting spatially dispersed beam 64 is then retro-reflected and shifted by the pair of plane mirrors 54iii and 54iv, which are disposed in a "rooftop" configuration. The retro-reflected light 64', 62', 56' follows the same path in the reverse direction and leaves the compressor 26 as an output beam 56' parallel to the input beam 56.

It will be readily understood that the optical components 54i, 54ii, etc may be different and/or arranged in a different configuration than the one illustrated herein. By way of example, transmission gratings may be substituted for the reflective gratings without departing from the scope of the invention. Furthermore, various multi-pass configurations, where light impinges on each grating more than twice, may also be used.

Figure 4A:
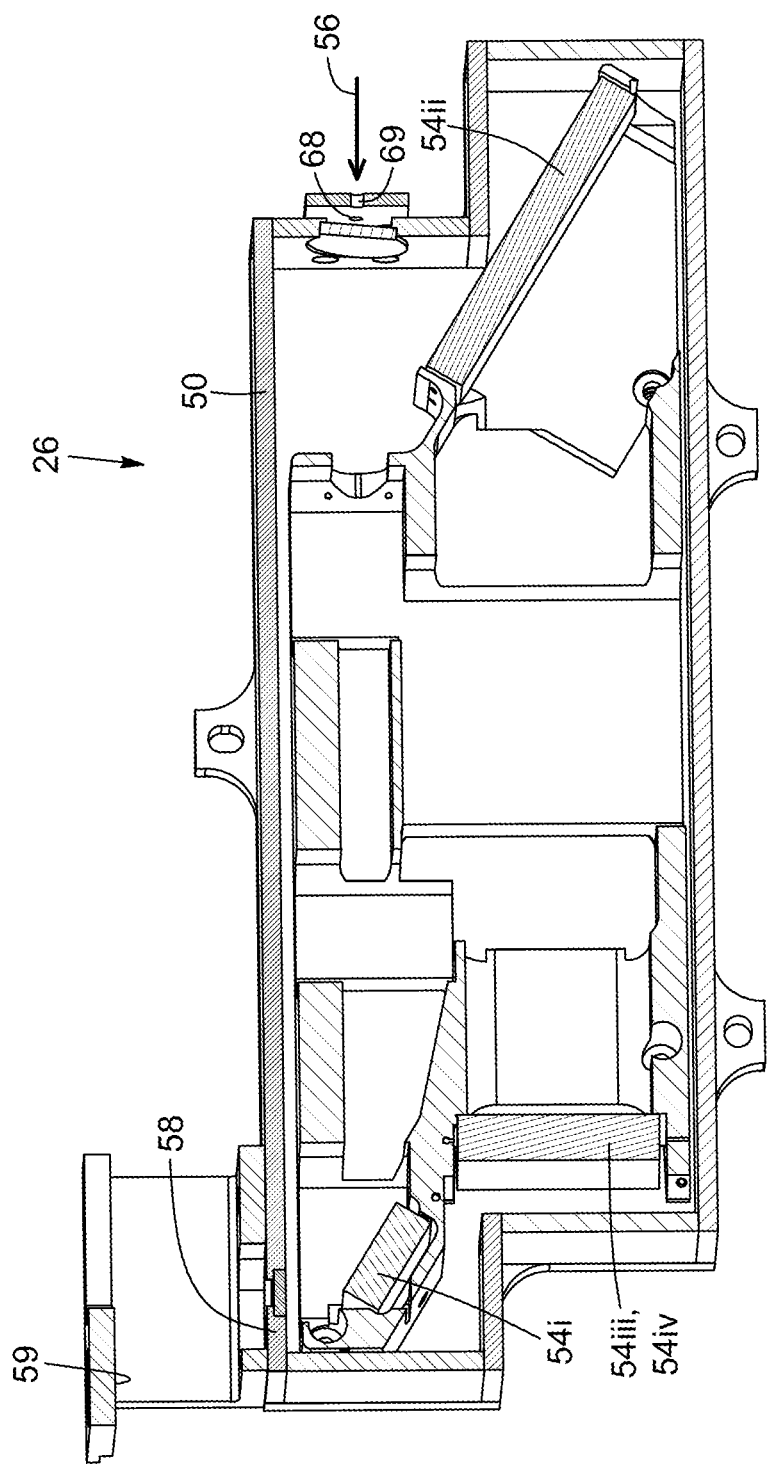
FIG. 4A is a side view of a bulk compressor according to one variant.
Figure 4B:
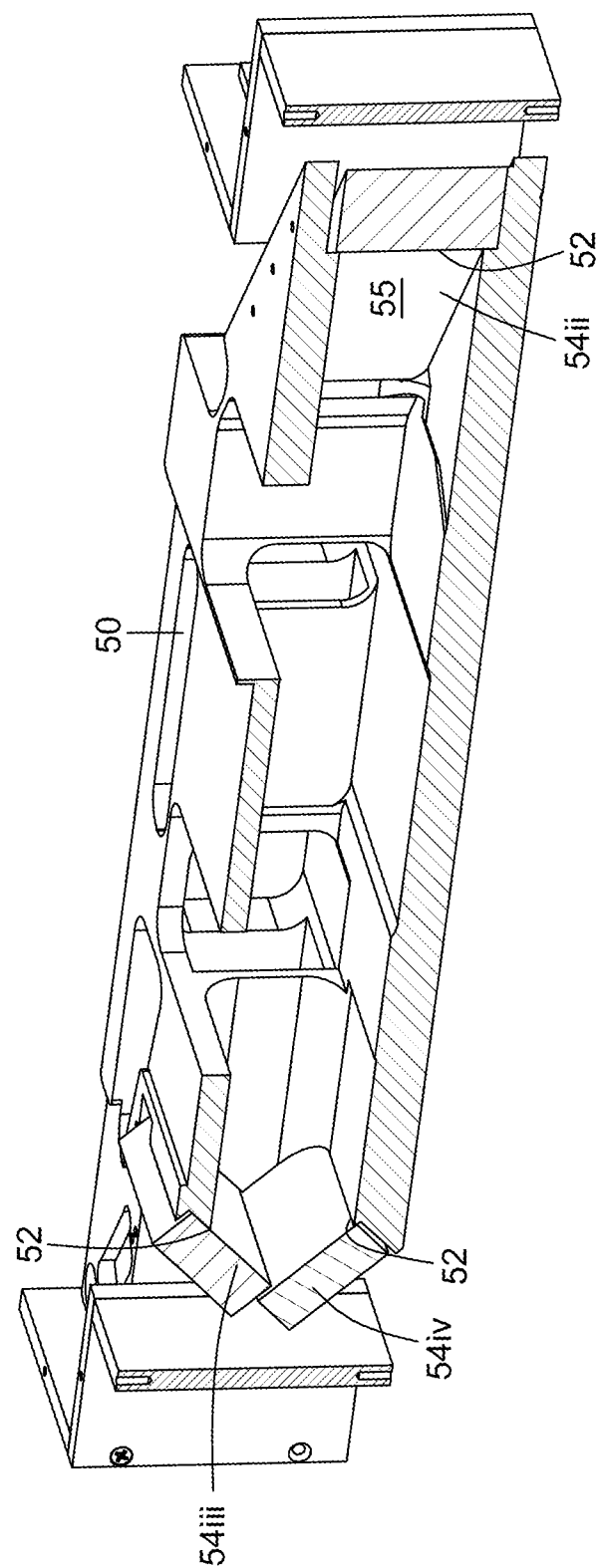
FIG. 4B is a side elevation from the bottom of the compressor of FIG. 4A.
Figure 4C:
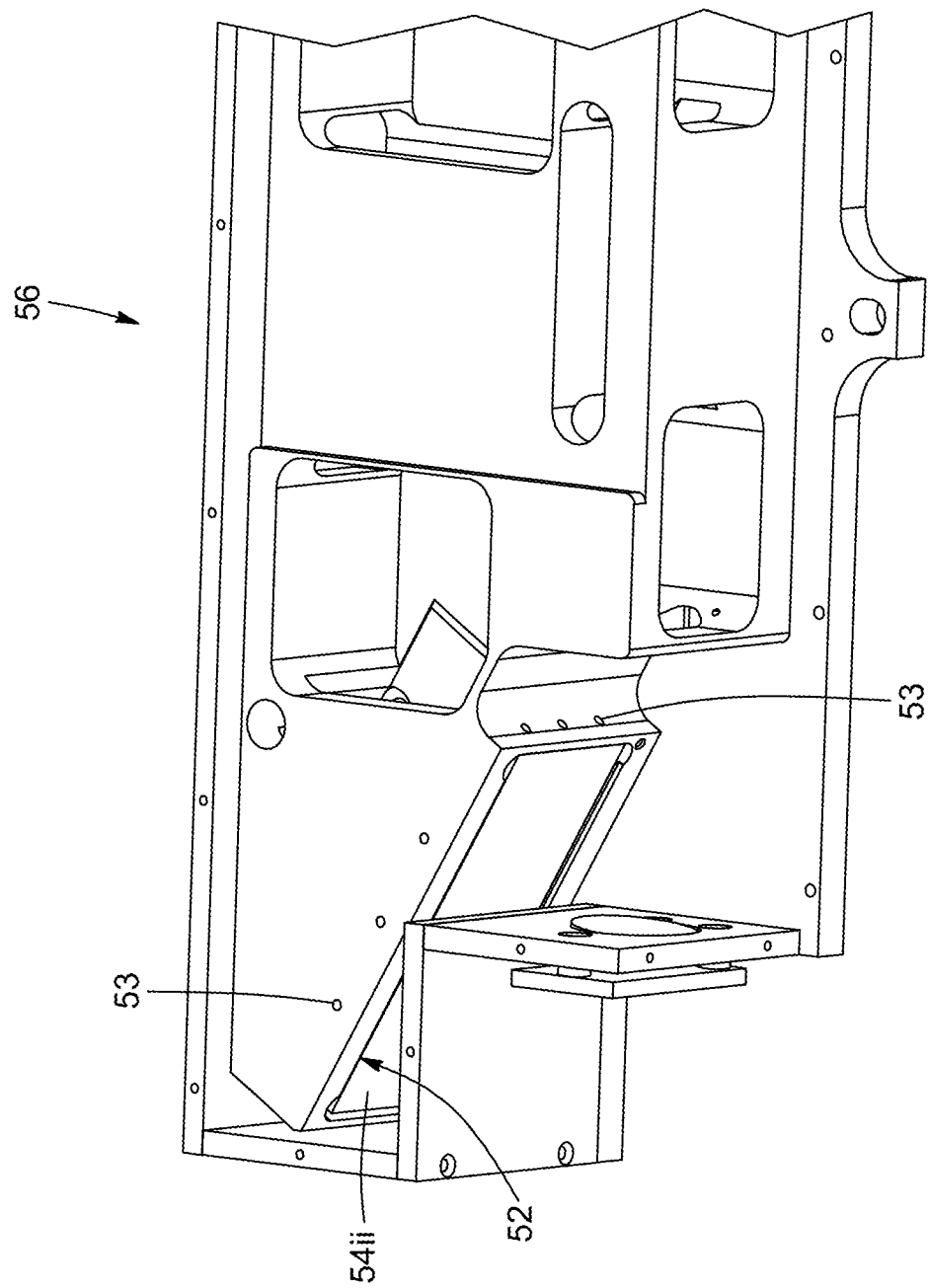
FIG. 4C is an enlarged side elevation view from the top of a portion of the compressor of FIG. 4A.

Referring to FIGS. 4A and 4B, there is shown a side view and a bottom elevation view of the interior of the bulk compressor 26. Referring to FIG. 4C, there is shown a side elevation view from the top of the upper left corner of the compressor 26 in the view of FIG. 4A, showing the back of the second grating 54ii. In some implementations at least one of the optical components 54 is in direct contact with the corresponding mounting surface 52 of the mounting block 50 through its front face 55 (see FIG. 4B), i.e. the face destined to interact with light. Preferably, the corresponding mounting surface 52 forms a frame or collar surrounding a light passage. The front face of the optical component 54 comprises a peripheral portion affixed to the mounting surface 52. To ensure direct contact between the front face of the optical component 54 and the mounting surface 52, the optical components are glued to the mounting block from the side. For example, the mounting block may include side walls surrounding each collar, and a plurality of side holes 53 may extend through these sides walls for receiving an adhesive therethrough. The side holes 53 may be specially machined to that effect in the mounting block 50. Gluing from the side of the components, as opposed to applying adhesive between the front face of the optical component 54 and the mounting surface 52, has the advantage of avoiding alignment errors due to uneven adhesive thickness. Using the front face of the components as a contact surface has several advantages compared to using the back face. Firstly, the surface quality requirements of reflective optical components are much higher on the optical surface than on the back face. Perfect parallelism between faces is also never guaranteed, nor is substrate thickness. Using the front face as a contact point ensures that the optical surfaces are as close to their desired placement as possible. Front face mounting also has the advantage of reducing the effects of temperature-related deformation of the optical materials. It is however to be noted that in other variants the optical elements may be affixed to the mounting surfaces through their back face, for example in embodiments where the optical element is used in transmission and the advantages of front face mounting may be less relevant.

Referring to FIG. 5A to 5D, one example of a method or process for mounting and aligning the optical elements in a bulk compressor such as described herein is illustrated.

Figure 5B:
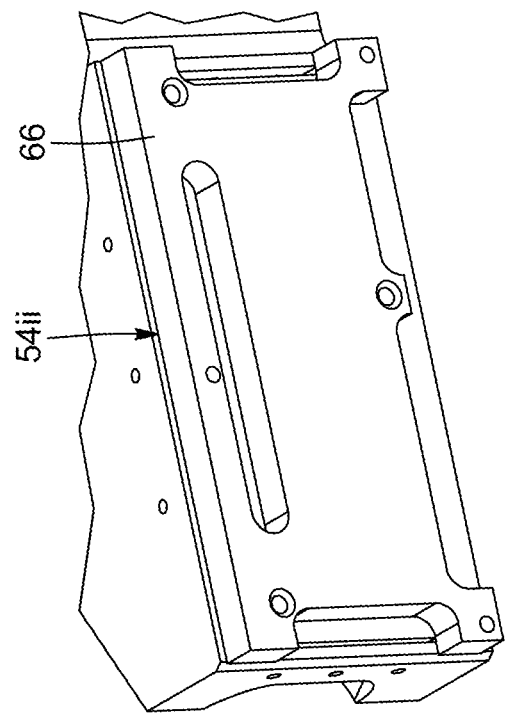
FIGS. 5A and 5B illustrate clamps used in the mounting of the optical elements of the compressor on the mounting block.
Figure 5A:
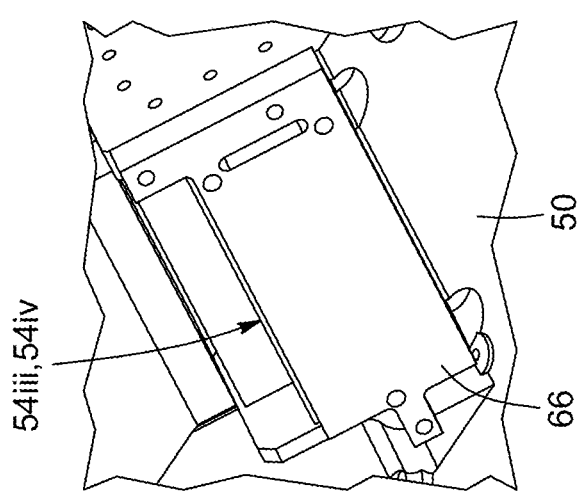

Referring to FIG. 5A, the mounting method first involves affixing both mirrors to the corresponding mounting surfaces of the mounting block using temporary fixtures. In the illustrated example of FIG. 5A, the mirrors 54iii and 54iv are shown mounted onto their respective mounting surfaces 52 from their front face and the temporary fixtures are embodied by clamps 66 affixed to the back of the mirrors 54iii, 54iv, sandwiching the mirror between to corresponding mounting surface 52 and clamp 66. Setscrews screwed into respective hole through the clamp 66 and the mounting block 50 may be used to hold the clamp in place and apply pressure on the sandwiched mirror. The mirrors are then glued from the side, as explained above. The temporary fixtures may be removed once the adhesive has cured.

In typical implementations, since the planes on which the optical surfaces of the optical components lie are entirely determined by the mounting block, almost all degrees of freedom during assembly are removed. This is highly desirable, as it makes assembly much faster and reliable than the assembly of prior art devices. The only remaining alignment liberty is on what is referred to as the "clocking angle", which is the rotation angle of a given optical component around the axis perpendicular to the plane defined by the corresponding mounting surface. In embodiments using diffraction gratings and mirrors such as the one described above, clocking has no significant impact on the mirrors 54iii, 54iv. Clocking may however be relevant to the positioning of the diffraction gratings 54i, 54ii. Indeed, the optimal clocking angle depends on the dicing of the diffraction grating, i.e. the perpendicularity of the lines of the grating with respect to the substrate base. Residual errors on the clocking angle impact the beam profile both spatially and temporally. While errors in the beam temporal profile can be corrected through a tuning of the pulse stretcher, such a mechanism cannot compensate for errors in the spatial profile of the beam. In some implementation, therefore, a one-time alignment procedure may be performed on the first and second gratings 54i and 54ii to adjust their clocking angle.

In accordance with such an alignment procedure, the first grating 54i and the second grating 54ii (shown in FIG. 5B) are first positioned in contact with their respective mounting surfaces. They are temporarily held in place from the back using four setscrews and from the bottom using two additional setscrews. In the exemplary design, a temporary fixture such as a clamp 66 is further used on the second grating 54ii.

Figure 5D:
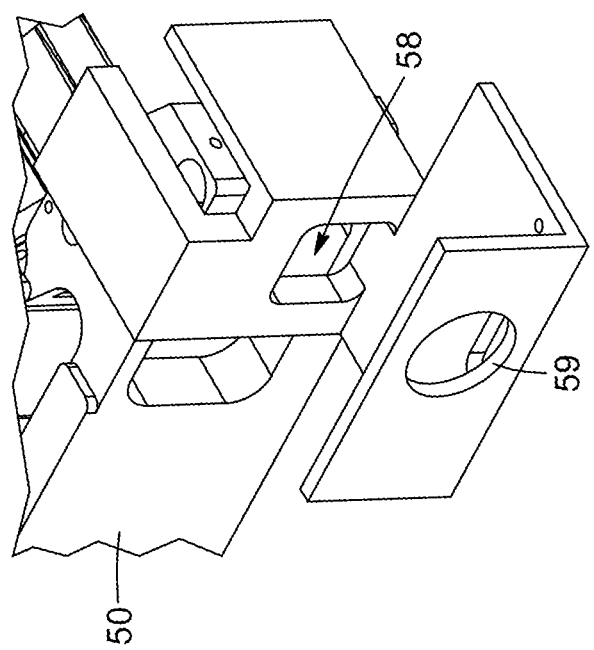
FIGS. 5C and 5D illustrate targets for use in alignment of the compressor with respect to the input beam.
Figure 5C:
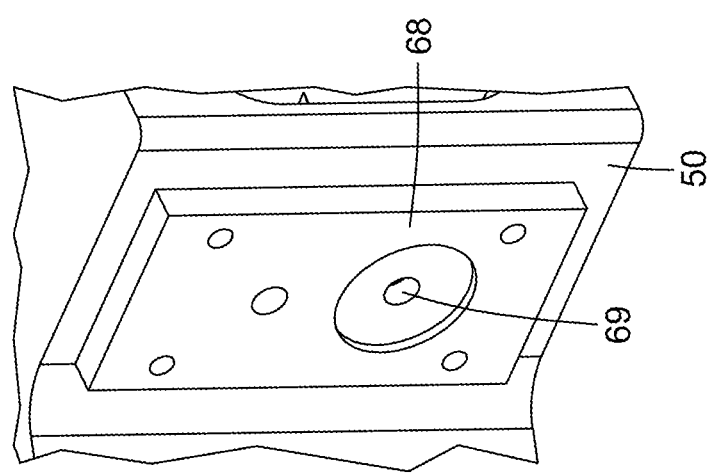

Next, referring to FIGS. 5C and 5D and with additional reference to FIG. 5A, the input beam 56 is used to fine-tune the alignment of the compressor 26, using a pair of alignment targets 68 and 59 respectively positioned at the light input of the compressor 26 and outside of opening 58 in the mounting block 50. The orientation of the assembly is chosen such that the input beam 56 passes through a hole 69 in the first alignment target 68 and such that the zeroth order reflection on the first grating 54i is centered on the second target 59. Given that the path of an unrefracted light beam is entirely specified by its position at two points in space, at this point the mounting block is correctly aligned with respect to the input beam and does not need to be moved further. However, a further rotation of the mounting block 50 around the axis of the input beam 56, while not affecting the alignment of the compressor with respect to the input beam 56, can be used to align the system with respect to an external reference plane 72, for example an optical table. This rotation liberty can be used to make the zero order reflection 60 on the first grating 54i parallel to this reference plane 72 by ensuring that the distance between the zero order beam and the reference plane is constant (e.g. height from the table top) at all positions. Assuming the input beam 56 is parallel to the reference plane (See FIG. 3B), the mounting block 50 is thus positioned such that, once the complete system is correctly aligned, beams 56, 56', 60, 60', 62, 62', 64, 64' and 70 will all be parallel to the reference plane 72.

The clocking of the first grating 54i is then coarsely adjusted using two setscrews (not shown) holding it from below. Correct clocking is verified by confirming that the zeroth order reflection 70 on the second grating 54ii is parallel to the reference plane 72 by adjusting the clocking of the first grating 54i so that this distance between the zero order reflection 70 from the second grating 54ii is constant at all positions.

The clocking of the second grating 54ii is also coarsely adjusted using two setscrews (not shown) holding it from below. Similarly to the preceding step, correct clocking may be confirmed by validating the parallelism between the upshifted zeroth order reflection 70' from the second grating 54ii.

In some variants, the clocking of both gratings may be fine-tuned by optimizing beam quality using a beam analyzer. Finally, both gratings are glued in place and the corresponding temporary fixture is removed after the adhesive has cured.

Figure 6:
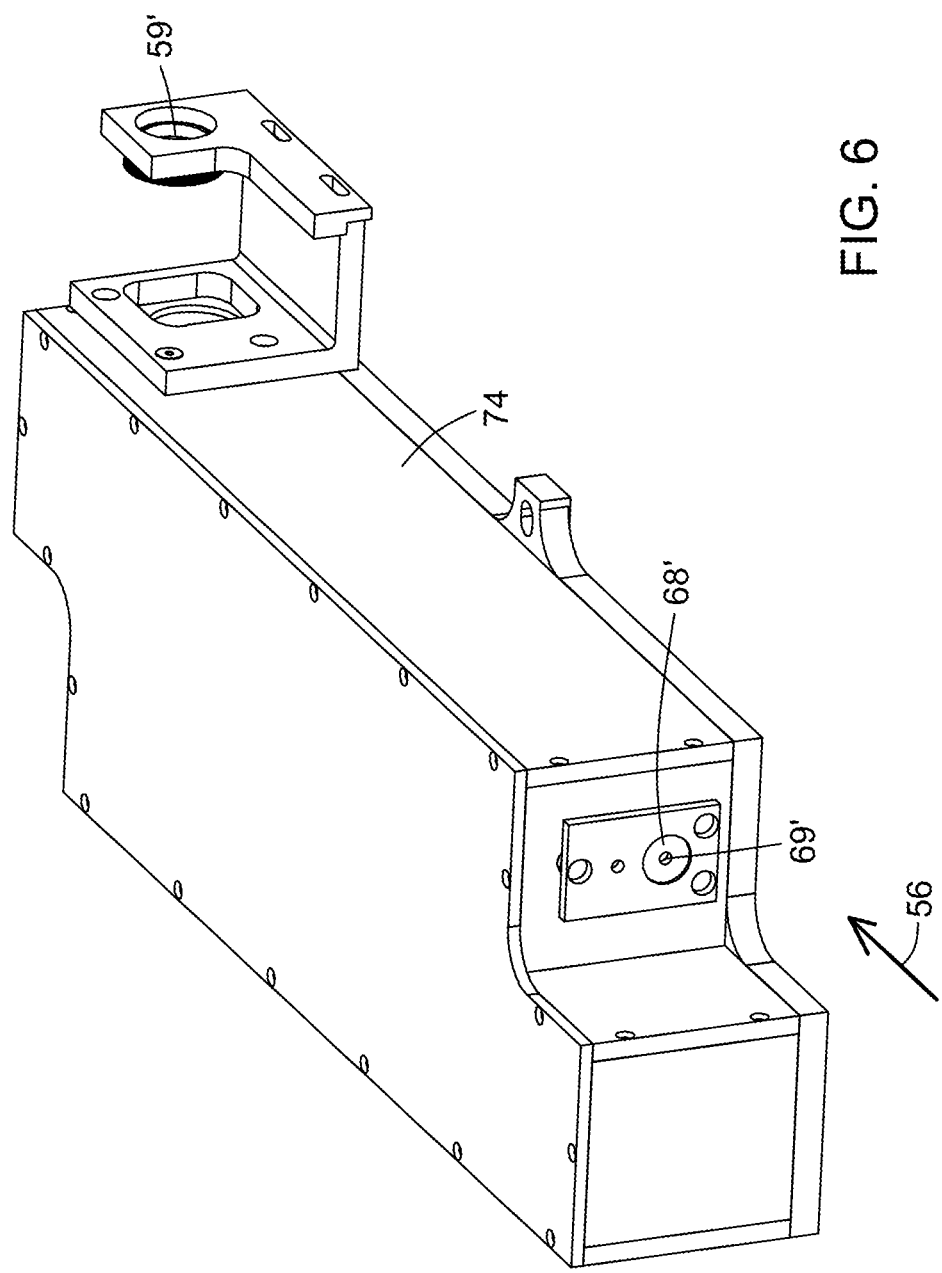
FIG. 6 is a side elevation view of the compressor provided in an external enclosure and provided with external alignment targets.

The preceding procedure only needs to be fully applied once. To use the assembled compressor in a different optical system, only the step of aligning the entire compressor 26 with respect to input beam 56 needs to be repeated, making subsequent alignments much faster and simpler. Referring to FIG. 6, there is shown an embodiment where an external enclosure 74 is used to protect the mounting block from external perturbations and dust. In such an embodiment, the alignment of the compressor with the input beam 56 may be performed by affixing a pair of guides similar to the ones used on the bulk compressor during the assembly/first alignment step, on the external enclosure 74 to facilitate external alignment. In one embodiment, the pair of guides includes a removable plate 68' containing a hole 69' positioned at the input of the compressor, and a target 59' placed so as to intercept the zero-order beam at the output of the first grating. In this configuration, once the compressor is aligned in a way that the beam reaches the target 59', the compressor is guaranteed to be aligned correctly relative to the input beam.

As mentioned above, the bulk compressor is internally self-aligned up to machining precision, and a suitable coupling assembly such as described above may be used to align it with the incoming light beam. Advantageously, any residual misalignment, resulting mostly from machining tolerances of the mounting block, may be corrected using the tuning mechanism of the stretching FBG.

Figure 7:
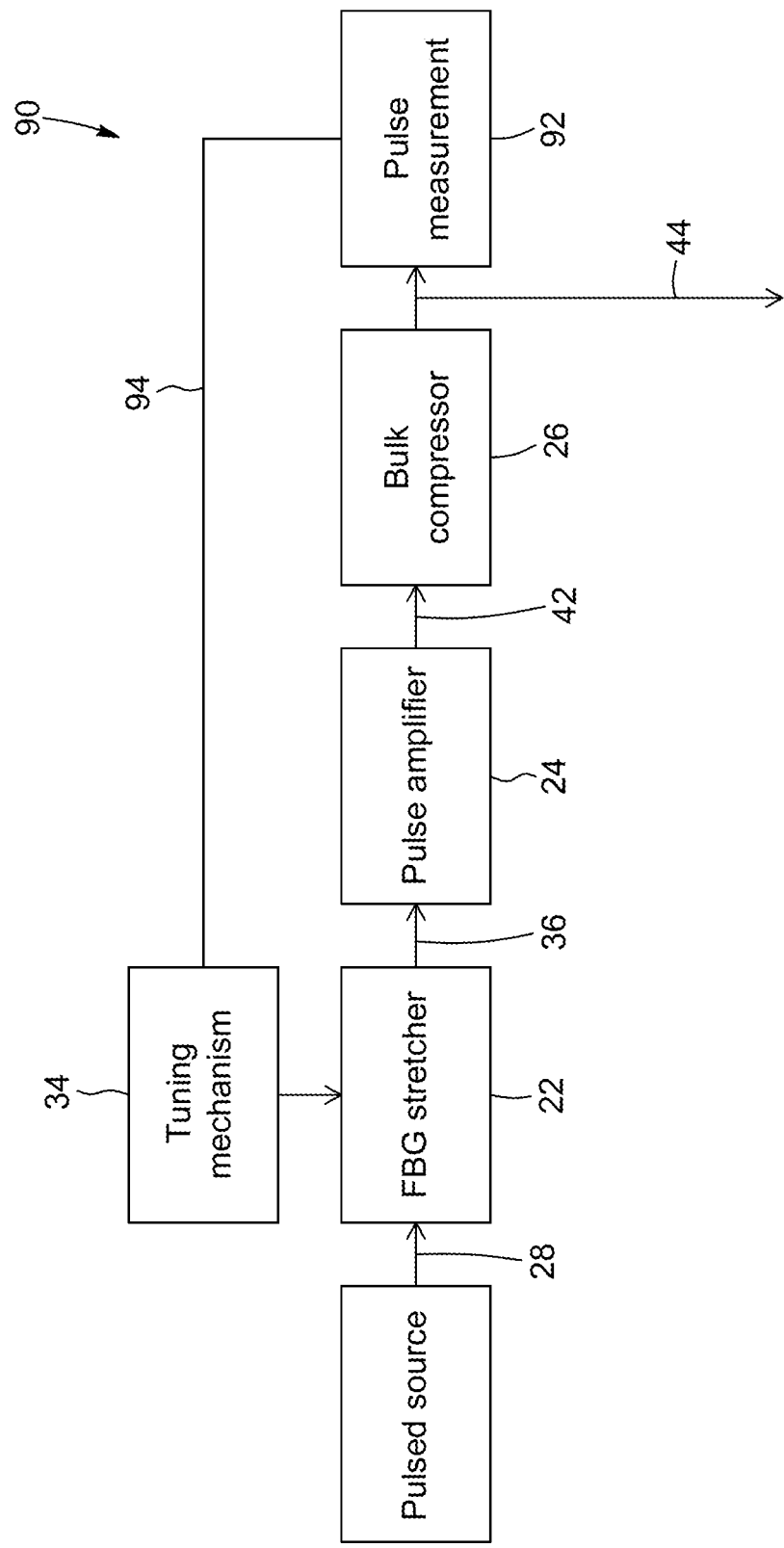
FIG. 7 is a schematized representation of a CPA system provided with a feedback loop.

Referring to FIG. 7, there is shown a configuration for the CPA system 20 using a feedback loop 90 allowing the tuning mechanism 34 of the fiber pulse stretcher 22 to compensate for misalignments in the bulk compressor 26. The feedback loop 90 may include a pulse measurement device 92 measuring and analysing the amplified compressed optical pulses 44 and sending a suitable feedback signal 94 to the tuning mechanism 94, as well known in the art. In this configuration, the tuning mechanism 34 may additionally be used to compensate for manufacturing errors in the dispersion profile of the stretching FBG, as well as nonlinear phase effects that may affect the pulse in the pulse amplifier 24 or other portions of the CPA process. As output pulse energy is increased in a CPA system, nonlinear effects, such as self-phase modulation, affect the temporal phase of the pulse during its propagation, which, in turn, affects its group delay profile in the frequency domain. This changes the optimal stretching/compressing conditions, which results in the need to compensate either at the stretcher 22 or the compressor 26 to maintain an optimally short compressed pulse. In the case of the present CPA system 20, the tuning, whether to compensate for manufacturing errors, alignment errors, deviations from the specified system at the time of the design, or nonlinear effects due to high pulse energies, is done using the tuning mechanism 34 of the FBG stretcher 22, through feedback loop 90. The feedback loop 90 may be automated or can be very well be done manually if the system characteristics and output energies remain constant. As an example, the intensity autocorrelation of the amplified compressed optical pulses 44 may be measured using an autocorrelator (not shown). The dispersion profile of the FBG may then be tuned to optimize a chosen property of the autocorrelation function representing compression quality, for example its full width at half maximum. More generally, any measurement sensitive to peak pulse power may be used as a feedback signal to optimize pulse compression, such as the output power from a second order nonlinear crystal, a two photon detector, etc.

In some implementations, the CPA system may be provided as a single device including the pulse stretcher, the fiber amplifier and the bulk compressor pre-assembled and aligned. In other variants, the bulk compressor may be provided on its own, for example as an OEM device. In yet another implementation, an OEM module including both the pulse stretcher and the bulk compressor may be provided for integration into a larger system including a fiber amplifier.

Of course, numerous modifications could be made to the embodiment described herein without departing from the scope of the invention.

The invention claimed is:

1. A chirped pulse amplification system for amplifying optical pulses, comprising:
a pulse stretcher comprising an optical fiber provided with a Fiber Bragg grating (FBG) having a dispersion profile designed to stretch each of the optical pulses into stretched optical pulses, the pulse stretcher further comprising a tuning mechanism coupled to said FBG for tuning said dispersion profile;
an amplifier receiving and amplifying the stretched optical pulses into amplified stretched optical pulses; and
a bulk compressor provided downstream the amplifier for compressing the amplified stretched optical pulses into amplified compressed optical pulses, the bulk compressor comprising a mounting block made of solid material and defining a plurality of mounting surfaces, the bulk compressor further comprising a plurality of optical components performing said compressing and mounted on the mounting block in a fixed mutual spatial relationship, each of the optical components being rigidly affixed to a respective one of the mounting surfaces, at least one of the mounting surfaces forming a collar surrounding a light passage, and the optical component affixed to said at least one of the mounting surfaces having a front face comprising a peripheral portion mounted in direct contact with said collar.

2. The chirped pulse amplification system according to claim 1, wherein the pulse stretcher comprises a circulator successively connecting an input port for receiving the input optical pulses, an FBG port connected to said optical fiber to direct the input optical pulses towards the FBG and receiving the stretched optical pulses, and an output port for directing the stretched optical pulses towards the amplifier.

3. The chirped pulse amplification system according to claim 1, wherein the FBG has a chirped grating period.

4. The chirped pulse amplification system according to claim 1, wherein the pulse stretcher comprises a tuning mechanism coupled to the FBG for tuning the dispersion profile of the FBG.

5. The chirped pulse amplification system according to claim 4, wherein the tuning mechanism is configured to apply a temperature variation to the optical fiber which is non-uniform along the FBG.

6. The chirped pulse amplification system according to claim 4, wherein the tuning mechanism is configured to apply a strain on the optical fiber which is non-uniform along the FBG.

7. The chirped pulse amplification system according to claim 4, further comprising a feedback loop controlling the tuning mechanism based on the amplified compressed optical pulses.

8. The chirped pulse amplification system according to claim 7, wherein said feedback loop comprises a pulse measurement device disposed downstream the bulk compressor and configured to measure and analyse the amplified compressed optical pulses, the pulse measurement device sending a feedback signal to the tuning mechanism.

9. The chirped pulse amplification system according to claim 7, wherein the feedback loop is configured to adjust the dispersion profile of the FBG of the pulse stretcher to compensate for at least one of misalignments or manufacturing errors of said system or nonlinear effects induced in the amplified stretched optical pulses by the amplifier.

10. The chirped pulse amplification system according to claim 1, wherein the amplifier is a fiber amplifier.

11. The chirped pulse amplification system according to claim 1, wherein the mounting block of the bulk compressor is a monolithic structure.

12. The chirped pulse amplification system according to claim 11, wherein the mounting block of the bulk compressor is made of a machinable and thermally stable material.

13. The chirped pulse amplification system according to claim 1, wherein each optical component of the bulk compressor is one of a grating, a lens, or a mirror.

14. The chirped pulse amplification system according to claim 1, wherein the optical components of the bulk compressor are mounted into a Treacy configuration.

15. The chirped pulse amplification system according to claim 1, wherein the bulk compressor comprises an input receiving the amplified stretched optical pulses as an input beam, and the optical components of the bulk compressor comprise:
a first grating angularly dispersing the input beam;
a second grating spatially dispersing the input beam; and
a pair of plane mirrors shifting and retro-reflecting the input beam for retro-propagation through the second grating and first grating.

16. The chirped pulse amplification system according to claim 15, wherein the pair of plan mirrors are disposed in a rooftop configuration.

17. The chirped pulse amplification system according to claim 1, wherein the optical components are glued to the mounting block from the side.

18. The chirped pulse amplification system according to claim 1, wherein the at least one of the mounting surfaces of the bulk compressor forming a collar surrounding a light passage consists of each of the mounting surfaces of the bulk compressor.

19. A stretcher-compressor pair for use with an amplifier in a chirped pulse amplification system, the stretcher-compressor pair comprising:
a pulse stretcher having an input port configured to receive input optical pulses and an output port configured to output stretched optical pulses, the pulse stretcher comprising an optical fiber provided with a fiber Bragg grating (FBG) having a dispersion profile designed to stretch the input optical pulses, said pulse stretcher further comprising and a tuning mechanism coupled to the FBG for tuning said dispersion profile; and
a bulk compressor having an input configured to receive amplified stretched optical pulses and an output configured to output amplified compressed optical pulses, the bulk compressor comprising a mounting block made of solid material and defining a plurality of mounting surfaces, the bulk compressor further comprising a plurality of optical components mounted on the mounting block in a fixed mutual spatial relationship, each of the optical components being rigidly affixed to a respective one of the mounting surfaces, at least one of the mounting surfaces of the bulk compressor forming a collar surrounding a light passage, and the optical component affixed to said at least one of the mounting surfaces having a front face comprising a peripheral portion mounted in direct contact with said collar.

20. The stretcher-compressor pair according to claim 19, wherein the pulse stretcher comprises a circulator successively connecting said input port, an FBG port connected to said optical fiber to direct the input optical pulses towards the FBG and receiving the stretched optical pulses, and said output port.

21. The stretcher-compressor pair according to claim 19, wherein the FBG has a grating period with a pre-existing chirp and the tuning mechanism is configured to modify said chirp.

22. The stretcher-compressor pair according to claim 19, wherein the FBG has a uniform grating period and the tuning mechanism is configured to impose a chirp thereon.

23. The stretcher-compressor pair according to claim 19, wherein the tuning mechanism is configured to apply a temperature variation to the optical fiber which is non-uniform along the FBG.

24. The stretcher-compressor pair according to claim 23, wherein the tuning mechanism comprises:
an elongated heat conductive member in thermal contact with the optical fiber provided along said FBG; and
a plurality of heat pumping elements in contact with the elongated heat conductive member and distributed along a length thereof.

25. The stretcher-compressor pair according to claim 19, wherein the tuning mechanism is configured to apply a strain on the optical fiber which is non-uniform along the FBG.

26. The stretcher-compressor pair according to claim 19, wherein the mounting block of the bulk compressor is a monolithic structure.

27. The stretcher-compressor pair according to claim 26, wherein the mounting block of the bulk compressor is made of a machinable and thermally stable material.

28. The stretcher-compressor pair according to claim 19, wherein each optical component of the bulk compressor is one of a grating, a lens, or a mirror.

29. The stretcher-compressor pair according to claim 19, wherein the optical components of the bulk compressor are mounted into a Treacy configuration.

30. The stretcher-compressor pair according to claim 19, wherein the bulk compressor comprises an input receiving the amplified stretched optical pulses as an input beam, and the optical components of the bulk compressor comprise:

a first grating angularly dispersing the input beam;

a second grating spatially dispersing the input beam; and a pair of plane mirrors shifting and retro-reflecting the input beam for retro-propagation through the second grating and first grating.

31. The stretcher-compressor pair according to claim 30, wherein the pair of plan mirrors are disposed in a rooftop configuration.

32. The stretcher-compressor pair according to claim 19, wherein the optical components are glued to the mounting block from the side.

33. The stretcher-compressor pair according to claim 19, wherein the at least one of the mounting surfaces of the bulk compressor forming a collar surrounding a light passage consists of each of the mounting surfaces of the bulk compressor.

\* \* \* \* \*